(12) United States Patent
Jbira

(10) Patent No.: US 7,539,118 B2
(45) Date of Patent: May 26, 2009

(54) MULTITRACK OPTICAL DISC READER

(75) Inventor: Arougg Jbira, Southampton (GB)

(73) Assignee: NXP B.V., Eindhoven (NL)

( * ) Notice: Subject to any disclaimer, the term of this patent is extended or adjusted under 35 U.S.C. 154(b) by 563 days.

(21) Appl. No.: 10/511,211

(22) PCT Filed: Apr. 3, 2003

(86) PCT No.: PCT/IB03/01348

§ 371 (c)(1),
(2), (4) Date: Oct. 13, 2004

(87) PCT Pub. No.: WO03/088232

PCT Pub. Date: Oct. 23, 2003

(65) Prior Publication Data

US 2005/0232124 A1 Oct. 20, 2005

(30) Foreign Application Priority Data

Apr. 18, 2002 (GB) .................................. 0208834.2

(51) Int. Cl.
*G11B 7/00* (2006.01)
(52) U.S. Cl. ................................ 369/124.02; 369/44.37
(58) Field of Classification Search ............ 369/124.02, 369/44.37
See application file for complete search history.

(56) References Cited

U.S. PATENT DOCUMENTS

| | | | |
|---|---|---|---|
| 5,793,549 A | 8/1998 | Alon et al. | |
| 5,907,526 A * | 5/1999 | Alon et al. | 369/30.22 |
| 5,959,953 A | 9/1999 | Alon et al. | |
| 6,028,827 A | 2/2000 | Alon et al. | |
| 6,137,763 A * | 10/2000 | Dahan et al. | 369/95 |
| 6,216,201 B1 | 4/2001 | Ado et al. | |

FOREIGN PATENT DOCUMENTS

WO WO9837554 8/1998

OTHER PUBLICATIONS

"Algorigthm For Managing Multiple First-In, First-Out Queues From a Single Shared Random-Access Memory" Aug. 1, 1989 IBM Technical Disclosure Bulletin, IBM Corp. New York, U.S. vol. 32, No. 3B pp. 488-492.*

"Algorithm for Managing Multiple First-In, First-Out Queues Froma a Single Shared Random-Access Memory", IBM Tech. Disclosure Bulletin, IBM Corp., NY, vol. 32, No. 3B, Aug. 1, 1989, pp. 488-492, XP000029766.

* cited by examiner

*Primary Examiner*—Wayne R Young
*Assistant Examiner*—LaTanya Bibbins

(57) ABSTRACT

A multitrack optical disc reader (1) is disclosed comprising a multitrack optical pick up (11) for reading data from multiple tracks of an optical disc (10) and outputting the data from each track in respective data streams, and multiple first-in-first-out (FIFO) memories (21) for temporarily storing the data streams. In accordance with the present invention, wherein the pickup may selectively output data streams from less than the maximum number of tracks that can be read by the pickup, the multiple FIFO memories are provided in a common memory bank, and when less than the maximum number of tracks are being read by the pickup, the size of at least one FIFO memory in use is greater than the total available FIFO memory in the common memory bank divided by the maximum number of tracks that can be read by the pickup.

1 Claim, 2 Drawing Sheets

MULTITRACK OPTICAL DISC READER

This invention relates to a multitrack optical disc reader comprising a multitrack optical pick up for reading data from multiple tracks of an optical disc and outputting the data from each track in respective data streams, and first-in-first-out (FIFO) buffers for temporarily storing data from the respective data streams.

FIG. 1 shows, schematically, a conventional optical disc reader 1 comprising a multitrack optical pick up 11 for reading data from five adjacent tracks of an optical disc 10 and outputting the data read from each track in five data streams. Each data stream is fed in to an integrated circuit 12 in which the data streams are combined and the combined data decoded. Specifically, each data stream is fed in to front end (FE) processing circuitry 13 where bit data is recovered and demodulated, and this data is then temporarily stored in a FIFO buffer 14. From the FIFO buffers, the data streams are combined using a multiplexer 15 and the combined data stored in a fast access, SDRAM memory 18 located off-chip. Decoding circuitry 17 located on the integrated circuit retrieves and decodes the combined data stored in the SDRAM memory 18 and feeds the decoded data to an output 20, for example, as a video or audio stream. The FE processing circuitry, FIFO buffers, multiplexer and decoder are all control by a microcontroller (μC) 16 which in turn is controlled by an off-chip central processing unit (CPU) 19.

The temporarily storage of data streams in FIFO buffers enables data to be written from the FIFO buffers to the SDRAM memory in bursts which is necessary if the fast access, SDRAM memory is to be written to efficiently. Unfortunately, hardwired FIFOs buffers substantially increase the gate count of any integrated circuit which contains them, and therefore there is a trade off between using small FIFOs, i.e. a low gate count, and achieving fast memory access.

According to the present invention, a multitrack optical disc reader of the aforementioned type is provided with a memory bank in which the FIFO buffers may be dynamically defined.

Where the disc reader is able to use and is using less than the maximum number of tracks that can be read by the pickup, as is common, the present invention enables at least one of the FIFO buffers to be defined to have a size greater than would otherwise be the case. That is, greater than the total FIFO memory that can be defined in the memory bank divided by the maximum number of tracks that can be read by the pickup. For any given amount of FIFO memory (and associated gate count), larger FIFOs are used and thus larger bursts of data can be subsequently written to fast access memory, thereby increasing the efficiency of the same.

Also, only FIFO buffers for data streams for those tracks used need to be defined and where this is the case, each of the FIFO buffers may be defined to has a size equal to the total FIFO memory divided by the number of tracks being used. That is, the available FIFO memory is shared equally amongst the tracks in use.

The present invention will now be described, by way of example only, with reference to the accompanying schematic drawings in which.

Figure 1:
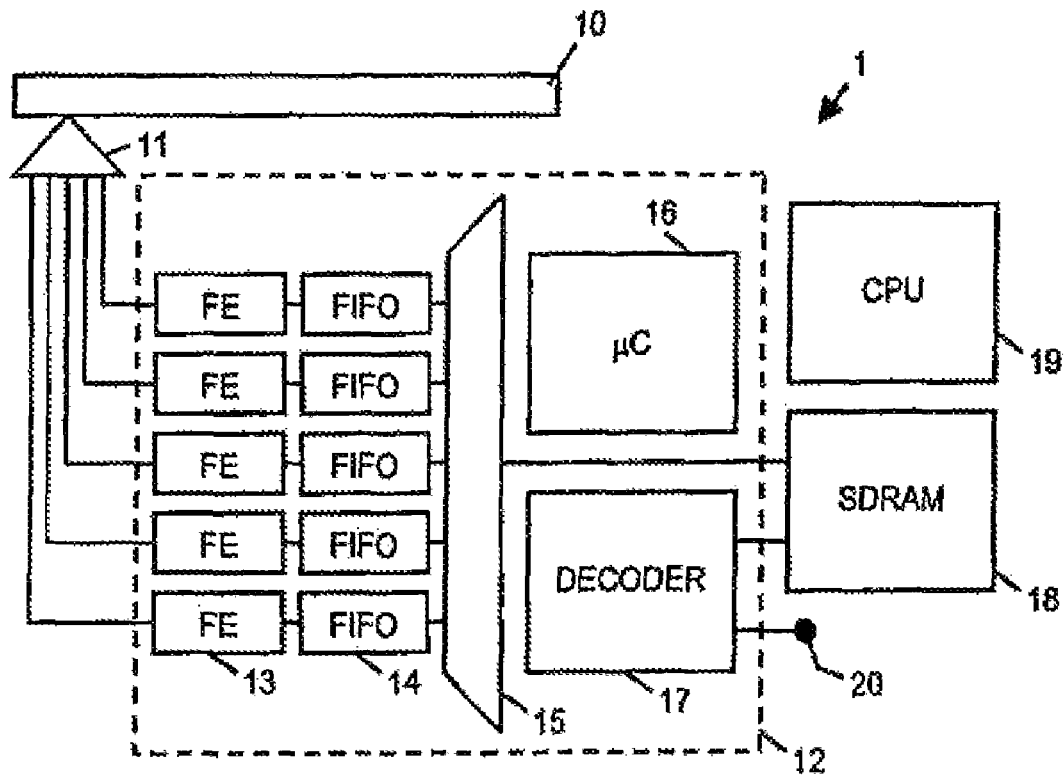
FIG. 1 shows, schematically, a conventional multitrack optical disc reader as hereinbefore described.
Figure 2:
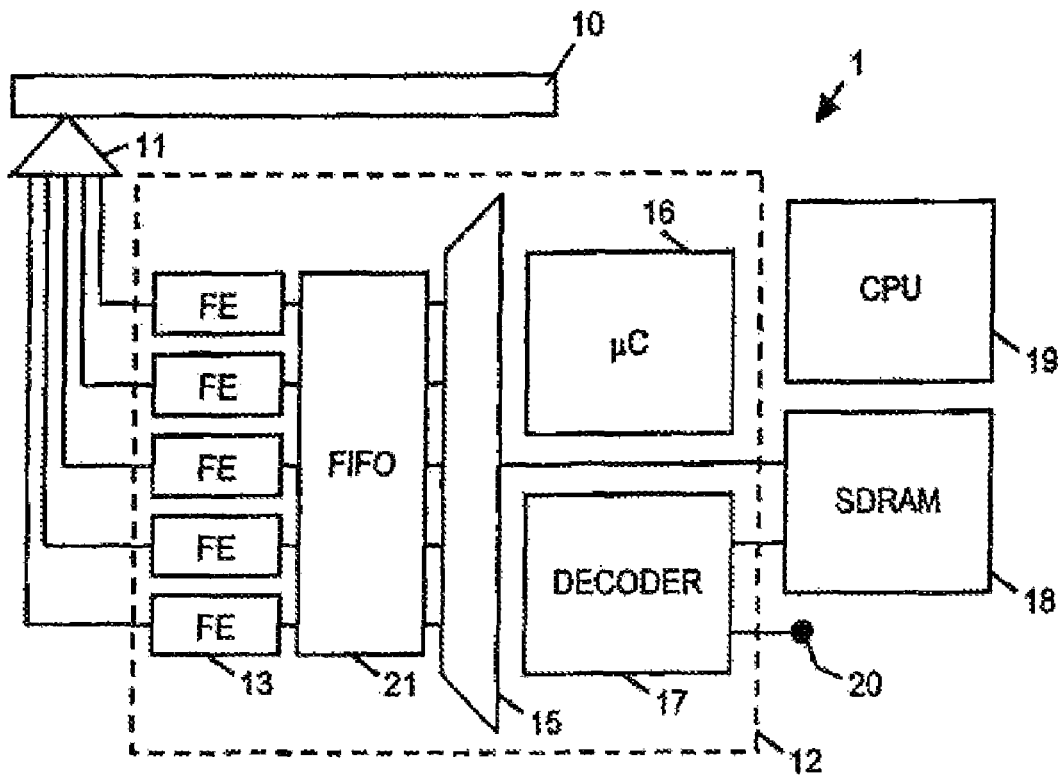
FIG. 2 shows, schematically, a multitrack optical disc reader in accordance with the present invention.

The same reference signs are used to refer to corresponding or similar features in both the conventional multitrack optical disc reader of FIG. 1 and the multitrack optical disc reader of FIG. 2 according to the present invention.

Referring to FIG. 2, an optical disc reader 1 is shown comprising all the features of the multitrack optical disc reader of FIG. 1 except that the disc reader is able to use less than the maximum number of tracks that can be read by the pickup. Also, in accordance with the present invention, the FIFO buffers are may be dynamically defined in a common memory bank 21.

For the purposes of illustration, suppose only the inner, outer and middle tracks of the 5 track optical pick up are being used and thus only data from those tracks is being streamed to the integrated circuit 12 where the data streams are combined and the combined data decoded. As two out of 5 tracks are not being used, 3 equally sized FIFO buffers may be defined in the memory bank 21 of a size two thirds greater than would be the case if all five tracks were being used. Therefore, any subsequent data burst transferring data from the FIFO buffers to the fast access, SDRAM memory 18 located off-chip can be two thirds greater, thereby increases the efficiency of this transfer and, with the transfer being under the control of microcontroller (μC) 16, so reducing the load on the CPU 19.

Figure 3:
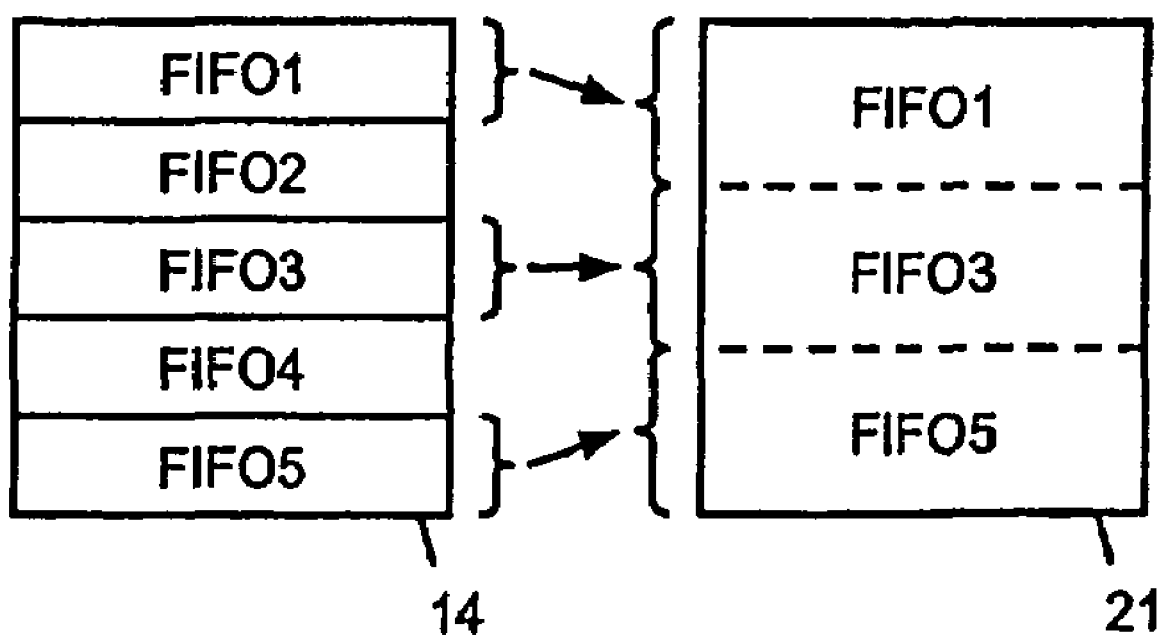
FIG. 3 illustrates the mapping of buffered data stored in the conventional disc reader of FIG. 1 compared to that of the disc reader of the present invention of FIG. 2.

This increase FIFO size is illustrated in FIG. 3 which maps available FIFO buffered data stored in the conventional disc reader of FIG. 1 when all 5 tracks (labelled 1 to 5) are in use to that of the disc reader of the present invention of FIG. 2 when only inner, outer and middle tracks are in use (tracks 1, 3 and 5).

In the above described examples of a conventional multitrack optical disc reader and one in accordance with the present invention, the fast access SDRAM memory is located off-chip though, of course, this could also be another type of memory and/or integrated with the FE circuitry, FIFO buffers, multiplexer and decoder on the integrated circuit.

From reading the present disclosure, other modifications will be apparent to persons skilled in the art. Such modifications may involve other features which are already known in the design and use of multitrack optical disc drives and component parts thereof and which may be used instead of or in addition to features already described herein, and at least including those features described in U.S. Pat. Nos. 5,793,549, 5,907,526, 5,959,953, 6,028,827 and 6,216,201.

The invention claimed is:

1. A multitrack optical disc reader comprising:
   a multitrack optical pick up for reading data from multiple tracks of an optical disc and outputting data from each track in respective data streams; and
   a memory bank in which first-in-first-out (FIFO) buffers for temporarily storing data from the respective data streams may be dynamically defined,
   wherein the reader can use less than the maximum number of tracks that can be read such that when less than the maximum number of tracks that can be read are being used, one or more of the FIFO buffers are defined to have a size equal to or greater than the total FIFO memory that can be defined in the memory bank divided by the number of tracks that can be read being used or the maximum number of tracks that can be read by the pickup.

* * * * *